June 7, 1949.   S. J. TEMPLE   2,472,178
ELECTRIC HEATING
Filed Sept. 18, 1947
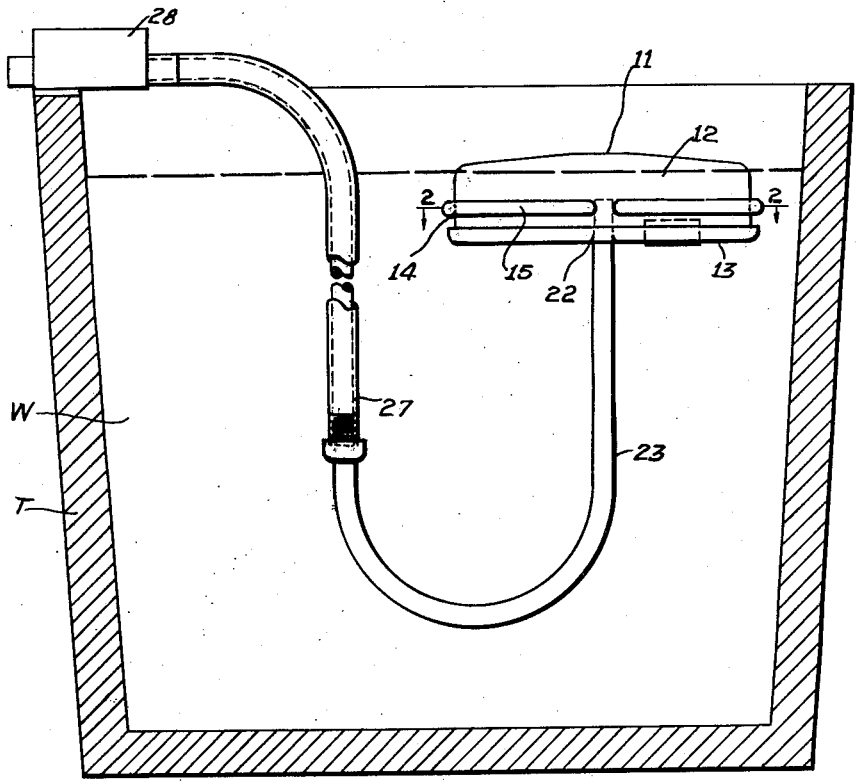
Fig.1.
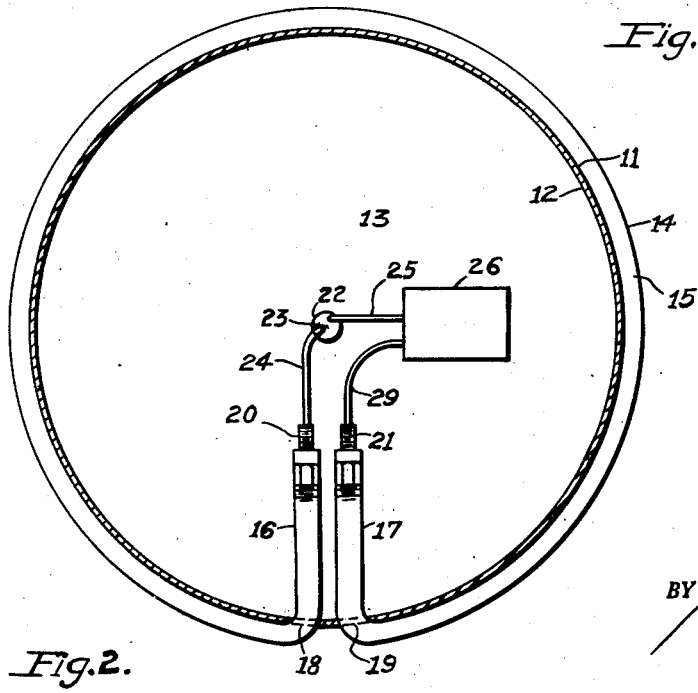
Fig.2.
SIDNEY J. TEMPLE
INVENTOR.
BY 
ATTORNEY

Patented June 7, 1949

2,472,178

UNITED STATES PATENT OFFICE 2,472,178

ELECTRIC HEATING

Sidney J. Temple, Forest Hills, Pa., assignor to Edwin L. Wiegand Company, Pittsburgh, Pa., a corporation of Pennsylvania Application September 18, 1947, Serial No. 774,735

3 Claims. (Cl. 219—41)

My invention relates to electric heating, and the principal object of my invention is to provide electric heating apparatus suitable and economical to maintain a portion of the surface of a body of liquid against congealing, for example, a portion of the surface of a body of water in a watering trough or the like, thereby to continue access to the water within the trough under temperatures at which otherwise the entire surface of the water would be frozen.

In the drawing accompanying this specification and forming a part of this application I have shown for purposes of illustration that embodiment of my invention which I consider to be the best means of carrying my invention into practice, and in this drawing:

Figure 1 is a side elevation of the illustrative embodiment of my invention, applied for example to a watering trough; and Figure 2 is an enlarged section on the line 2—2 of Figure 1.

Referring to the drawings, the embodiment of my invention therein shown comprises a hollow body 11 constructed to float on the surface of the body of liquid, for example, the water W in the watering trough T, and consisting of a cup-shape metal stamping 12 and a cover-shape metal stamping 13 brazed together fluid-tight.

Carried by the body 11 is a metal-sheathed tubular electric heating element 14 having an active section 15 substantially completely encircling the body 11 and end sections 16 and 17 extending through apertures 18 and 19 in the wall of the cup-shape body section 12 to within the interior of the body 11 and there provided with electrical terminals 20 and 21 respectively.

To maintain the body 11 fluid-tight the wall of the cup-shape body section 12 is brazed fluid-tight to the sheath of the element 14 at the apertures 18 and 19, and to insure adequate mounting of the element 14 the sheath of the element 14 is spot-brazed to the wall of the cup-shape body section 12 at one or more places along the extent of the active section 15 of the element 14.

Extending through an opening 22 at the center of the cover-shape body section 13 is a rubber-covered two-conductor cable 23 fitting the opening 22 fluid-tight and having its one conductor 24 connected to the element terminal 20 and its other conductor 25 connected to one terminal of a thermostatic switch 26 secured to the interior face of the cover-shape body section 13 and thus responsive to the temperature of the liquid immediately below the body 11.

The cable 23 continues through a conduit 27 to a connection box 28 mounted on the trough T, and in which the two cable conductors 24 and 25 are available for connection to a suitable supply of electric power, and to complete the circuit the other terminal of the thermostatic switch 26 is connected by a conductor 29 to the other terminal 21 of the electric heating element 14.

According to my preferred method of operation the thermostatic switch 26 is set to open at a temperature only slightly above the temperature of solidification of the liquid, for example, as applied to a watering trough, slightly above the freezing temperature of water, whereupon the apparatus will act to maintain the surface of the water against freezing over the area encompassed by and extending slightly beyond the periphery of the heating element 14, but will permit the water to freeze over the remainder of the surface, thus greatly diminishing the amount of power that would otherwise be required.

Further the temperature of the body 11 will not be raised materially above freezing, so that the stock has ready access to the water in the trough merely by pressure of the nose against the body 11, temporarily depressing the body 11 and affording access through the unfrozen area, after which the body 11 automatically returns to its previous position.

From the foregoing it will be apparent that the illustrated embodiment of my invention does provide electric heating apparatus suitable and economical to maintain a portion of the surface of a body of liquid against congealing, and therefore accomplishes at least the principal object of my invention.

On the other hand, obviously the application of my invention is not limited to a watering trough, and likewise my invention is not limited to the specific embodiment herein illustrated, and particularly in the number and location and extent of the heating element or elements, and in various other features of construction which are not essential, but are merely what I now regard as preferable, and therefore the disclosure herein is illustrative only, and my invention is not limited thereto.

Wherefore I claim:

1. In combination: an electric heater constructed to float on a body of a liquid and thereupon to act to maintain at least the apposite portion of the surface of said body of liquid against congealing, comprising float means constructed and adapted to float said heater on said body of liquid, electric heating means carried by said float means and having one or more active portions distributed about the periphery of said heater and adapted to impart heat to the liquid adjacent thereto, switch means carried by said float means and connected to control the flow of power to said electric heating means, and thermostat means carried by said float means and constructed and connected to control said switch means responsive to temperature of the liquid beneath and adjacent the under portion of said float means; and conductor means, adapted to be connected to a supply of electric power, and constructed and arranged thereupon to conduct power from such supply to said electric heating means under control of said switch means.

2. In combination: an electric heater constructed to float on a body of liquid and thereupon to act to maintain at least the apposite portion of the surface of said body of liquid against congealing, comprising float means constructed and adapted to float said heater on said body of liquid, electric heating means carried by said float means and having one or more active portions distributed about the periphery of said heater and adapted to impart heat to the liquid adjacent thereto, switch means carried by said float means and connected to control the flow of power to said electric heating means, and thermostat means carried by said float means and constructed and connected to control said switch means responsive to temperature of the liquid beneath and adjacent the under portion of said float means, arranged to cause said switch means to open when the temperature of said liquid rises to only slightly above the congealing temperature of said liquid; and conductor means, adapted to be connected to a supply of electric power, and constructed and arranged thereupon to conduct power from such supply to said electric heating means under control of said switch means.

3. In combination: an electric heater constructed to float on a body of liquid and thereupon to act to maintain at least the apposite portion of the surface of said body of liquid against congealing, comprising hollow float means constructed and adapted to float said heater on said body of liquid, electric heating means carried by said float means and having one or more active portions disposed exteriorly of said float means and distributed about the periphery of said heater and adapted to impart heat to the liquid adjacent thereto, switch means carried by said float means and connected to control the flow of power to said electric heating means, and thermostat means mounted in said float means and constructed and connected to control said switch means responsive to temperature of the liquid beneath and adjacent the under portion of said float means; and conductor means, adapted to be connected to a supply of electric power, and constructed and arranged thereupon to conduct power from such supply to said electric heating means under control of said switch means.

SIDNEY J. TEMPLE.

REFERENCES CITED

The following references are of record in the file of this patent:

UNITED STATES PATENTS

| Number | Name | Date |
|---|---|---|
| 2,133,388 | Henderson | Oct. 18, 1938 |
| 2,297,030 | Snyder | Sept. 29, 1942 |
| 2,430,272 | Brodie | Nov. 4, 1947 |
| 2,432,918 | McCaskell | Dec. 16, 1947 |